UNITED STATES PATENT OFFICE.

GUILLIAM H. CLAMER AND JOSEPH G. HENDRICKSON, OF PHILADELPHIA, PENNSYLVANIA, ASSIGNORS TO AJAX METAL COMPANY, OF PHILADELPHIA, PENNSYLVANIA.

ALLOY.

No. 12,880. Specification of Reissued Letters Patent. Reissued Nov. 17, 1908.

Original application No. 655,402, dated August 7, 1900, Serial No. 7,714. Application for reissue filed August 28, 1908. Serial No. 450,703.

*To all whom it may concern:*

Be it known that we, GUILLIAM H. CLAMER and JOSEPH G. HENDRICKSON, citizens of the United States, residing at the city of Philadelphia, in the county of Philadelphia and State of Pennsylvania, have invented certain new and useful Improvements in Alloys, of which the following is a specification.

This invention relates to alloys and more particularly to alloys for antifriction bearings and the like.

The practical difficulty experienced with a copper-tin-lead mixture, is, that, in the process of cooling from the melted condition, a so-called eutectic or readily fusing alloy of copper and tin may be formed as a subsidiary, which solidifies slowly at a comparatively low temperature, allowing the lead with a still lower melting point to segregate and fall to the bottom, when present in quantity, producing what is known as a lead sweat. To obviate this, a high solidifying point for the copper-tin matrix is requisite, at which the copper-tin matrix shall set quickly and hold the lead properly distributed through it, before it has time to run off or settle; and with this secured an indefinite increase of lead within the requirements of bearings is possible. We have discovered that the manufacture of copper-tin-lead alloys, high in lead—above twenty per cent.—is regulated by a critical relation between the metals involved, by which, with tin at less than 7 per cent. by weight, lead at more than 20 per cent., and the balance, or 73 per cent., of copper, there is a quick solidification of the matrix without the forming of any appreciable eutectic alloy, the large percentages of lead present being held and retained without difficulty, a small percentage of other metals, such as antimony, zinc, iron, etc., to be found in ordinary brass scrap as impurities, being also permitted. These proportions conform to a critical point in the constitution of copper-tin alloys, on one side of which, according to the relative percentages employed, they solidify or set quickly, at a high temperature; and on the other, by reason of different percentages, they combine differently, forming among other subsidiary compounds, a certain eutectic mixture, which remain liquid for a much longer period, cooling slowly. This critical point is a well demonstrated scientific fact, which is generally, if not universally, accepted; and exists close to where there are nine parts of tin to ninety-one of copper, or relatively something over nine per cent. of the former. Having regard to this, and the consequences which flow from it when lead is additionally introduced, all tin-copper-lead alloys divide sharply into those which contain this relative proportion of tin and copper, which by reason of their high melting point and the absence of eutectic alloy permit of a large content of lead; and those which fall outside of these limits, where this is not possible. The adaptation of this principle in the production of anti-friction alloys for railroad bearings constitutes the merit of the present invention and the contribution made by it to the journal bearing art.

The invention therefore consists not in the establishment of exact and rigid proportions, but in the discovery of the application of the critical relation between tin and copper required to make possible high percentages of lead. Furthermore there is separated in the process of cooling from alloys in which the tin is in greater proportion than substantially 9 per cent. of tin and more than 91 per cent. of copper, a definite compound of tin and copper which is readily discernible under the microscope and which is hard and gritty and therefore undesirable in a bearing.

One object of the present invention is to fill a recognized want and provide for the manufacture of copper-tin-lead alloys for journal bearings which shall hold up more lead than heretofore, without the use of nickel, which is claimed in our applications, serially numbered 737,304 and 737,305.

In the described improvements we have discovered that a much higher percentage of lead, which is desirable, can be added to such alloys containing less than seven per cent. of tin than can be added to such alloys containing more than seven per cent. of tin, because the alloys containing less than seven per cent. of tin when poured into suitable molds, contain very little or none of the eutectic alloy. Consequently the whole mass of copper and tin will solidify quickly at a comparatively elevated temperature and in so doing will hold up the lead, so that a comparatively large proportion of it, as more than twenty per cent., may be introduced without separation.

To make our improved alloys, the copper is heated and melted until it is thoroughly liquid. The tin and lead are then added in the proportions of under seven per cent., by weight, of tin and not less than twenty per cent., by weight, of lead. The alloy is then cast in suitable molds.

We are aware of the fact that our alloys may be built up by the use of brass scrap which, as is well known, may contain, in addition to copper, antimony, zinc, iron, arsenic, phosphorus and bismuth and any and all soft metals in varying proportions.

It will be obvious to those skilled in the art to which our invention appertains that modifications may be made in details without departing from the spirit thereof. Hence we do not limit ourselves to the precise mode of procedure hereinabove set forth, but

Having thus described the nature and objects of our invention, what we claim as new and desire to secure by Letters Patent is:

1. The improvement in the production of copper-tin-lead alloys for bearings, which consists in limiting the proportion of tin to less than substantially nine per cent. of the copper in the mix and increasing the lead above twenty per cent. of the mix, whereby upon melting and casting a copper-tin alloy substantially free from slow solidifying combinations of copper and tin results, which alloy when cast sets quickly at a high temperature forming a matrix which holds up all the lead, substantially as described.

2. In the production of copper-tin-lead alloys for bearings, the described improvement which consists in holding up all of a high percentage content of mechanically held lead—more than twenty per cent. of the whole mass—by limiting the tin in the copper-tin matrix to below nine per cent. of the copper, in accordance with the existing critical point in the formation of copper-tin alloys, thereby providing a matrix of copper and tin substantially free from slow solidifying combinations of copper and tin and which on cooling solidifies quickly at a high temperature thus holding up the lead in any desired amount within the requirements of a bearing and preventing its separation from the copper-tin matrix during cooling, substantially as described.

In testimony whereof we have hereunto signed our names.

GUILLIAM H. CLA[illegible]R
JOSEPH G. HEN[illegible]SON.

Witnesses:
W. R. Wooters,
E. C. Hollis.